United States Patent
Langdon

(10) Patent No.: US 7,894,125 B2
(45) Date of Patent: Feb. 22, 2011

(54) ACOUSTO-OPTIC DEVICES

(75) Inventor: Roger Martin Langdon, Colchester (GB)

(73) Assignee: BAE Systems, London (GB)

(*) Notice: Subject to any disclaimer, the term of this patent is extended or adjusted under 35 U.S.C. 154(b) by 768 days.

(21) Appl. No.: 11/795,185

(22) PCT Filed: May 10, 2007

(86) PCT No.: PCT/GB2007/050249

§ 371 (c)(1),
(2), (4) Date: Jul. 11, 2007

(87) PCT Pub. No.: WO2007/138341

PCT Pub. Date: Dec. 6, 2007

(65) Prior Publication Data
US 2009/0284826 A1    Nov. 19, 2009

(30) Foreign Application Priority Data

May 30, 2006  (EP)  .................................. 06270055
May 30, 2006  (GB)  .................................. 0610604.1

(51) Int. Cl.
*G02F 1/33* (2006.01)

(52) U.S. Cl. ........................ 359/308; 359/310; 359/311; 359/313; 359/314; 359/346; 359/347; 359/359

(58) Field of Classification Search ................ 359/285, 359/305, 308–314, 337.22, 346, 347, 359
See application file for complete search history.

(56) References Cited

U.S. PATENT DOCUMENTS

| 3,539,245 A | | 11/1970 | Brienza | |
|---|---|---|---|---|
| 3,639,775 A | * | 2/1972 | Patel | ........................... 359/285 |
| 3,730,609 A | * | 5/1973 | Minemura | ................... 359/285 |
| 3,756,689 A | | 9/1973 | Hammond et al. | |
| 3,767,286 A | * | 10/1973 | Kusters et al. | .............. 359/308 |

(Continued)

FOREIGN PATENT DOCUMENTS

EP    1 243 966 A2    9/2002

(Continued)

OTHER PUBLICATIONS

P. V. Santos, "Collinear light modulation by surface acoustic waves in laterally structured semiconductors" Journal of Applied Physics, American Institute of Physics, NY, US, vol. 89, No. 9, May 1, 2001, pp. 5060-5066.

(Continued)

*Primary Examiner*—Evelyn A. Lester
(74) *Attorney, Agent, or Firm*—Kenyon & Kenyon LLP

(57) ABSTRACT

An acousto-optic module is provided, including a number of partially coupled optical resonators distributed within a dielectric medium and at least one acoustic transducer mounted on a surface of the dielectric medium for injecting an acoustic wave into the optical resonators so as to diffract light passing therethrough by means of Bragg diffraction. This acousto-optic module has been applied in particular to an improved tuneable optical filter in which an acoustic shear wave is generated and which travels through the acousto-optic module in a direction substantially parallel with a polarized light signal passing therethrough. The acousto-optic module is also applied to an improved optical frequency shifter.

22 Claims, 7 Drawing Sheets

U.S. PATENT DOCUMENTS

| | | | |
|---|---|---|---|
| 4,057,770 A * | 11/1977 | Henningsen et al. | 359/285 |
| 5,130,843 A | 7/1992 | He et al. | |
| 5,963,569 A | 10/1999 | Baumgart et al. | |
| 2001/0026659 A1 | 10/2001 | Sekine et al. | |
| 2008/0204857 A1 * | 8/2008 | Godshalk et al. | 359/305 |

FOREIGN PATENT DOCUMENTS

| | | |
|---|---|---|
| EP | 1 336 892 A1 | 8/2003 |
| EP | 1 243 966 A3 | 1/2004 |
| GB | 1 401 084 | 7/1975 |
| WO | WO 99/03016 | 1/1999 |

OTHER PUBLICATIONS

U.K. Patent Office, Search Report, Sep. 8, 2006, from related UK Patent Application No. GB0610604.1, filed May 30, 2006.

European Patent Office, Search Report, Oct. 20, 2006, from related European Patent Application No. EP06270055.4, filed May 30, 2006.

W-J. Xu and M. Ourak, "Angular measurement of acoustic reflection coefficient for substrate materials and layered structures by V(z) technique" NDT & E International, Butterworth-Heinemann, Oxford, GB, vol. 30, No. 2, Apr. 1997, pp. 75-83.

S. Krishnamurthy and P.V. Santos, "Optical modulation in photonic band gap structures by surface acoustic waves" Journal of Applied Physics, American Institute of Physics, NY, us, vol. 96, No. 4, Aug. 15, 2004, pp. 1803-1810.

* cited by examiner

ACOUSTO-OPTIC DEVICES

RELATED APPLICATION INFORMATION

This application is a United States National Phase Patent Application of, and claims the benefit of, International Patent Application No. PCT/GB2007/050249 which was filed on May 10, 2007, and which claims priority to British Patent Application No. 0 610 604.1, which was filed in the British Patent Office on May 30, 2006, and European Patent Application No. 06 270 055.4, which was filed in the European Patent Office on May 30, 2006, the disclosures of each of which are hereby incorporated by reference.

FIELD OF THE INVENTION

The present invention relates to improved acousto-optic devices, in particular but not exclusively to an improved tuneable optical filter and an improved optical frequency shifter suitable for use with light of wavelengths from infra-red to ultra-violet.

BACKGROUND INFORMATION

Acousto-optic devices of conventional design, exploiting the effects of Bragg diffraction in particular, have until recently required excessive levels of acoustic power to obtain high efficiency, particularly in the infra-red region of the spectrum. However, techniques for radically reducing the velocity of propagation of light through solid media have recently been developed with the advantage that the efficiency of acousto-optic interactions within the media is greatly enhanced allowing for significantly lower levels of acoustic power to implement these devices. These techniques depend on the creation of distributed optical resonators inside a dielectric medium which produce strong dispersion of refractive index around their resonance frequency, and hence a low group velocity for light having a similar frequency passing through the medium. Examples of such media include photonic crystals in which the group velocity of light is reduced to a value at least 100 times smaller than the velocity of light in a vacuum. Materials having this property will be referred to as "slow light" materials in the present patent specification. Such materials are being applied in novel ways to make improved acousto-optic devices of various types.

SUMMARY OF THE INVENTION

From a first aspect, the present invention resides in a tuneable optical filter, comprising:

a plurality of coupled optical resonators distributed within a dielectric medium having an optical input, for receiving polarised light signals, and an optical output;

at least one acoustic transducer mounted on a surface of the dielectric medium for generating an acoustic shear wave within the dielectric medium which propagates through the plurality of optical resonators in a direction substantially parallel to the direction of propagation of received light signals when passing therethrough; and a polariser for selecting light of a required angle of polarisation from a light signal output from the optical output.

Preferably each of the optical resonators is a Fabry-Perot etalon. Alternatively, the optical resonators may be implemented using a photonic crystal.

In a preferred embodiment according to this first aspect of the present invention where the filter is intended for use with light of infra-red wavelengths in particular, then each of the optical resonators may be formed by a first plate of dielectric material having parallel planar faces and a partially transmissive reflective coating applied to one such planar face, and a partially transmissive reflective coating applied to one planar face of a similar, adjacent plate of dielectric material, parallel with that of the first plate, and wherein a number of these plates with their reflective coatings are bonded together to form a block of optically coupled optical resonators.

In an alternative preferred implementation, each of the optical resonators may be formed by a plate of a first dielectric material disposed between two adjacent plates of a second different dielectric material having a different refractive index to that of the first material, each of the plates having plane parallel faces, and wherein alternate plates of the first and second dielectric material are bonded together to form a block of optically coupled optical resonators.

Preferably, an acoustic absorber is located to absorb acoustic energy that has passed through the plurality of optical resonators.

In a preferred embodiment, the optical input to the dielectric medium comprises an inclined planar face, and a prism is mounted with one face parallel to the inclined face so as to leave a gap at the interface between the dielectric medium and the prism. In this preferred embodiment, the inclined face is arranged to reflect a longitudinal acoustic wave injected into the dielectric medium by the transducer to thereby create the acoustic shear wave, and the angle of inclination of the inclined face is such that a polarised light signal, on passing through the prism and crossing the gap, enters the dielectric medium and propagates in a direction substantially parallel to the direction of propagation of the acoustic shear wave.

Preferably, the optical output from the dielectric medium comprises a further inclined planar face, and a further prism is mounted with one face parallel to the further inclined face so as to leave a gap at the interface between the dielectric medium and the further prism. In this arrangement, acoustic energy emerging from the optical resonators is reflected within the dielectric medium by the further inclined face, for example to deflect it towards an acoustic absorber.

From a second aspect, the present invention resides in an optical frequency shifter, comprising:

an acousto-optic module having a plurality of coupled optical resonators located within a dielectric medium and at least one acoustic transducer mounted on a surface of the dielectric medium, wherein the at least one acoustic transducer is arranged to inject an acoustic wave into the plurality of optical resonators so as to apply a frequency shift to an incident light signal passing therethrough.

Preferably, the at least one acoustic transducer is arranged to inject the acoustic wave into the plurality of optical resonators so that the angle of incidence of the acoustic wave with respect to the light substantially satisfies the Bragg condition for maximum diffraction of the light.

In a preferred embodiment according to this second aspect of the present invention, the optical frequency shifter comprises two of the acousto-optic modules arranged in a cascaded manner to apply first and second frequency shifts to an incident light signal passing therethrough.

Preferably, each of the optical resonators is a Fabry-Perot etalon. Alternatively, each of the optical resonators is provided by a photonic crystal.

In a preferred embodiment, where the filter is intended for use with light of infra-red wavelengths in particular, then each of the optical resonators may be formed by a first plate of dielectric material having parallel planar faces and a partially transmissive reflective coating applied to one such planar face, and a partially transmissive reflective coating applied to one planar face of a similar, adjacent plate of dielectric material, parallel with that of the first plate, and wherein a number of these plates with their reflective coatings are bonded together to form a block of optically coupled optical resonators.

In an alternative preferred implementation, each of the optical resonators may be formed by a plate of a first dielectric material disposed between two adjacent plates of a second different dielectric material having a different refractive index to that of the first material, each of the plates having plane parallel faces, and wherein alternate plates of the first and second dielectric material are bonded together to form a block of optically coupled optical resonators In a preferred embodiment, the at least one acoustic transducer comprises a plurality of transducer elements operable as a phased transducer array to inject an acoustic wave into the plurality of optical resonators at variable angles. Optionally, an acoustic lens may be disposed between the at least one acoustic transducer and the plurality of optical resonators, wherein the acoustic lens is shaped to form a substantially collimated acoustic wave in the vicinity of the plurality of optical resonators.

Preferably, an acoustic absorber may be located to absorb acoustic energy that has passed through the plurality of optical resonators.

This patent application describes new devices for laser beam frequency shifting and new forms of tuneable filter, both using the enhanced acousto-optic effect in slow light materials. In these devices the acoustic power requirement is greatly reduce, so they are likely to be of practical importance.

In the present patent specification, when referring to a Fabry-Perot interferometers, the term "etalon" is used in particular to refer to a component comprising a plate of dielectric material, transparent to light, with a reflective coating applied to each of the two planar surfaces of the plate. However, where the term "etalon" is used, it is intended that alternative implementations of the Fabry-Perot interferometer be included within the scope of the term including, for example, a component comprising an arrangement of plane parallel mirrors, or a component without mirror surfaces as such, where a resonance cavity is formed by boundaries between materials having differing refractive indices and reflection is achieved at those boundaries.

Where the terms "comprise", "comprises" or "comprising" are used in the present patent specification, they are to be interpreted in their non-exclusive sense as meaning include, includes or including but not limited to, respectively.

DETAILED DESCRIPTION

Embodiments of the present invention will now be described in more detail, and by way of example only, with reference to the accompanying drawings.

It is known that the velocity of propagation of light through materials can be slowed by a large factor if the material contains optical resonators tuned close to the frequency of the light, and distributed in a regularly spaced array. An example of such a material is a photonic crystal consisting of a transparent dielectric material containing a periodic variation of refractive index in one, two or three dimensions. An example of a photonic crystal commonly used is shown in FIG. 1.

Figure 1:
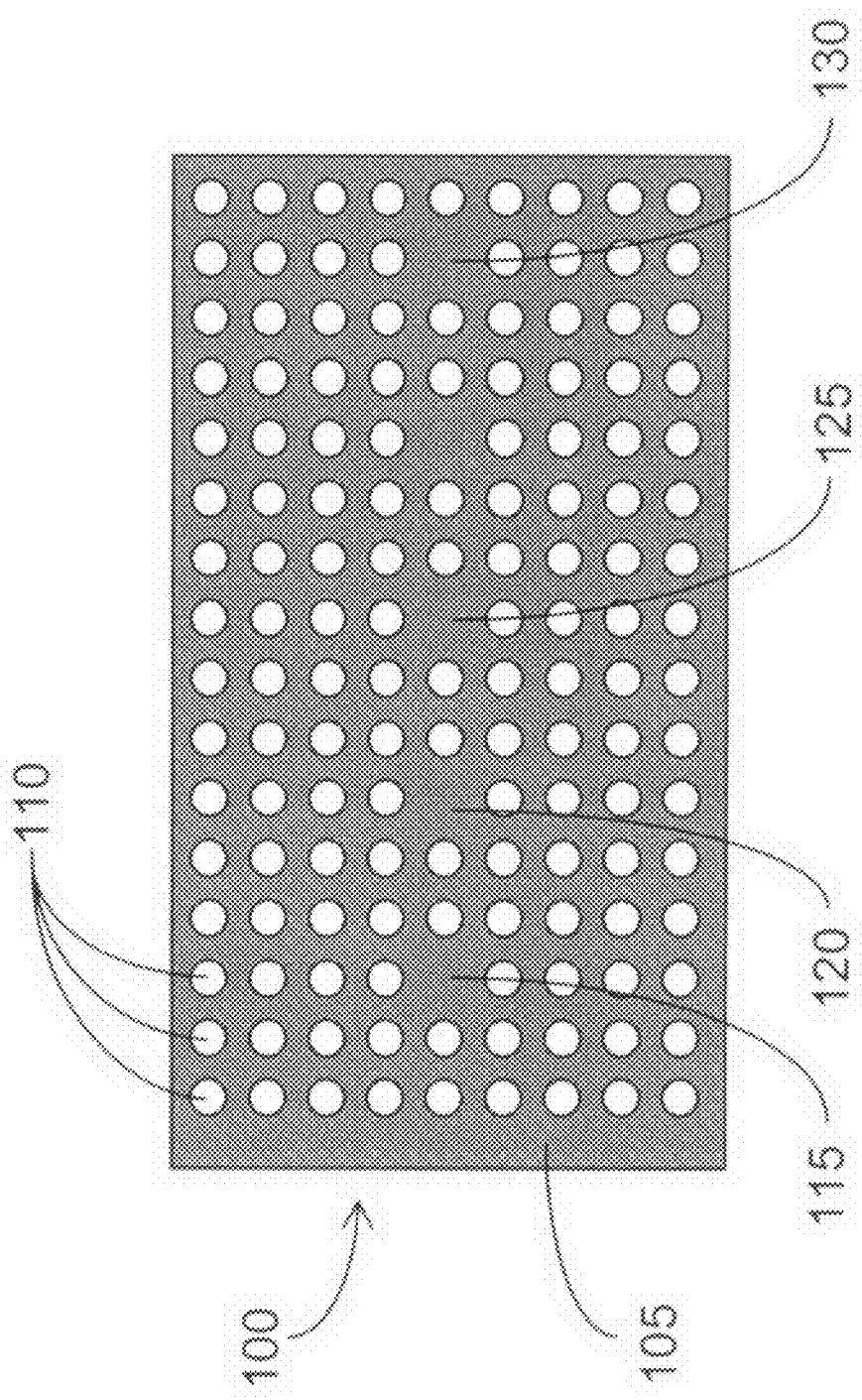
FIG. 1 shows a sectional view through of a known type of photonic crystal.

Referring to FIG. 1, a sectional view is provided of a known type of photonic crystal 100 comprising a dielectric material 105 having a number of dielectric rods 110 embedded in it of a different refractive index to that of the dielectric material 105. The rods 110 are uniformly spaced both horizontally and vertically by a fraction of an optical wavelength to form a regular structure. The photonic crystal 100 is transparent to light travelling at right angles to the direction of view shown in FIG. 1 at most wavelengths, but over specific ranges of wavelengths, called "stop-bands", light cannot propagate through the crystal 100 and is strongly reflected from the interfacing surfaces of the materials. The range of wavelengths covered by the stop bands is dependent upon the dimensions and refractive indices of the materials 105 and 110. When a defect is introduced into the regular structure, for example by removing one of the dielectric rods 110 thereby creating a vacancy 115, light contained within the defect (115) cannot escape through the surrounding photonic crystal, and so resonates over the range of wavelengths corresponding to the stop-bands.

If a number of such resonators are provided side by side in a regularly spaced array, represented by 115, 120, 125 and 130 in FIG. 1, and sufficiently close together such that light is partially coupled from any one resonator to each of the adjacent resonators, light is able to propagate from one resonator to another in sequence, and so pass through the photonic crystal 100. Owing to the delay in the build-up of light power in each successive resonator 115, 120, 125, 130, the velocity of propagation of light through the photonic crystal 100 is much lower than that in free space. If adjacent resonators are only loosely coupled together, the delay times can be very large, and consequently the propagation velocity can be very low. Velocities of 100 times less than the velocity of light in vacuum have been achieved in practice. Light propagating in materials with these properties is referred to as "slow light".

The interaction of slow light with acoustic waves, as exploited by preferred embodiments of the present invention, can be most simply explained by considering a photonic crystal containing a periodic arrangement of resonators in one direction only. Such a material may comprise a dielectric material containing a regularly spaced sequence of plane-parallel partially-transmissive mirrors. Each pair of mirrors constitutes an optical resonator for light propagating in directions approximately perpendicular to the mirror surfaces. This is because successive reflections of light between the mirrors interfere with one another causing resonances at bands of frequencies for which the mirror spacing is approximately equal to an integral number of half-wavelengths of the light. A particular type of photonic crystal comprises of a regularly spaced sequence of such resonators in which light is coupled from one resonator to the next through the partially transmissive mirrors. If all resonators have common resonance frequencies, light propagating through the photonic crystal at these frequencies will be slowed down.

The detailed operation of a device exploiting the acousto-optic interaction with slow light for use in preferred embodiments of the present invention will now be described with reference to FIG. 2.

Figure 2:
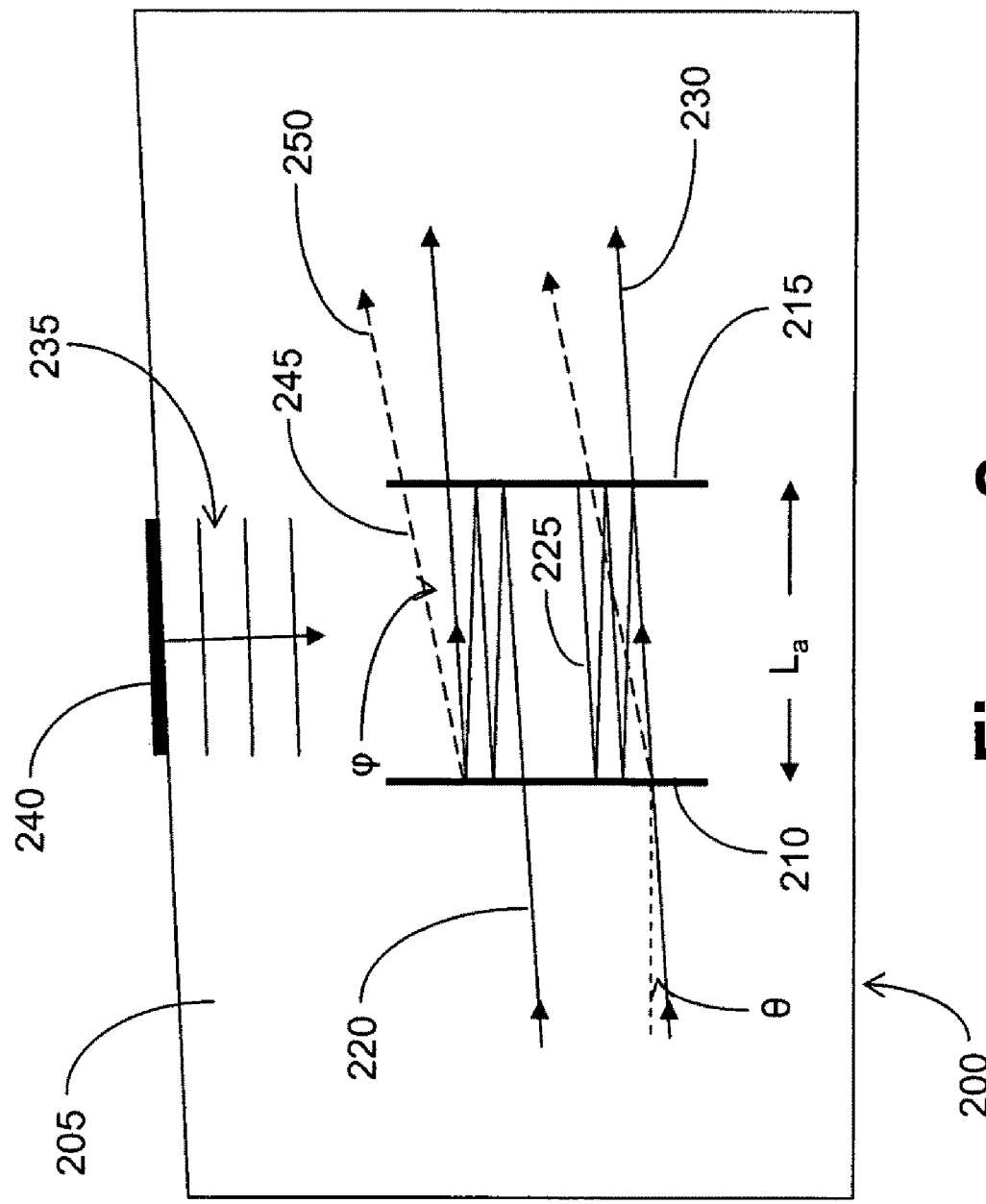
FIG. 2 shows a sectional view through a simple known acousto-optic device exploiting the enhanced acousto-optic effect.

Referring to FIG. 2, a sectional view is provided through a single resonator device 200 where a single pair of plane partially transmissive reflectors 210 and 215, for example partially silvered mirrors or dielectric reflectors, shown edge-on in FIG. 2, each having a reflectivity R, are mounted inside a uniform dielectric material 205 such that they are accurately parallel with each other and are spaced by a distance $L_a$. Such a structure is referred to in optical textbooks such as "Geometrical and Physical Optics", R S Longhurst, Longman Group Ltd, London 1973, on page 179, as a Fabry-Perot etalon, or as a Fabry-Perot interferometer. A light beam 220 of wavelength λ and intensity $I_1$ travelling inside the dielectric material 205 is incident on the partially transmissive reflector 210 at a small angle θ to the normal. Light passing through the reflector 210 is repeatedly reflected between the reflectors 210 and 215 causing optical interference between the reflected beams. This results in a beam 225 having a total intensity $I_2$ travelling between the reflectors 210 and 215. The incident light beam 220 has a diameter D, much larger than the product $L_a\theta$ so that repeated reflections of light between the reflectors 210 and 215 substantially overlap causing the beam 225 to have an approximately uniform intensity. A portion of the beam 225 passes through the partially transmissive reflector 210 to form an output beam 230 having an intensity $I_3$. Standard optical textbooks such as that referenced above show that the intensity of the output beam 230 is related to the reflector spacing $L_a$ and reflectivity R by the expression $$I_3 = \frac{I_1 T^2}{(1-R)^2 + 4R\sin^2\left(\frac{2\pi L_a}{\lambda}\cos(\theta)\right)} \quad (1)$$

where T is the transmission of the partially transmissive reflectors 210 and 215. The intensity $I_2$ of the beam 225 travelling between the reflectors 210 and 215 is $$I_2 = \frac{I_3}{T} \quad (2)$$

but since two beams of intensity $I_2$ travel in opposite directions in the space between the reflectors 210, 215 an interference pattern is formed with a peak intensity twice as large as the mean intensity. The intensity $I_3$ of the output beam has a maximum value at wavelengths $\lambda_N$ for which the following resonance condition applies:

$$\lambda_N = \frac{2L_a}{N}\cos(\theta) \quad (3)$$

were N is an integer. When this condition applies, the output beam intensity $I_3$ is $$I_3 = \frac{I_1 T^2}{(1-R)^2} \quad (4)$$

For the case where the reflectors 210 and 215 are multilayer dielectric mirrors which have substantially no loss, T=1−R and $I_3=I_1$. The travelling wave intensity $I_2$ between the reflectors 210, 215 is then $$I_2 = \frac{I_1}{1-R} \quad (5)$$

If the reflectivity R is close to unity, the intensity $I_2$ of light 225 between the reflectors 210, 215 can be very much higher than the intensity/of the incident light 220.

An acoustic wave 235 is generated by an ultrasonic transducer 240 attached to a surface of the dielectric medium 205 such that an acoustic wave 235 propagates in the material between the reflectors 210 and 215. The direction of the acoustic wave 235 is such that it interacts with the optical beam 225 causing part of the optical beam 225 to be diffracted at an angle φ with respect to the direction of the incident beam 220, forming a diffracted optical beam 245. Diffracted beam 245 is repeatedly reflected between the reflectors 210 and 215, forming a composite beam by interference, similar to that shown in FIG. 2 with reference to beam 220. Part of this composite beam is then transmitted through the reflector 215 forming an output beam 250. If the angles θ and φ are set such that the directions of the optical beams 225 and 245 are both close to directions of maximum transmission of the Fabry-Perot etalon defined by equation (3), then the optical beams 225 and 245 will both resonate, causing their intensities to be much larger than the intensity of the incident beam 220. The result of this is that a much larger fraction of incident optical power in the incident beam 220 is diffracted into the output beam 250 than would be the case if the Fabry-Perot etalon formed by the reflectors 210 and 215 were absent. Devices such as acousto-optic modulators, optical beam deflectors and acousto-optic tuneable filters which use acousto-optic interactions, may, according to preferred embodiments of the present invention, use optical resonators of this kind to operate with much less acoustic power while maintaining high optical diffraction efficiency.

The enhancement of acousto-optic diffraction efficiency that may be achieved in preferred embodiments of the present invention can be roughly estimated as follows. In accordance with equation 5, the average intensity of the travelling wave 225 is 1/(1−R) times the intensity of the incident beam 220 when the Fabry-Perot etalon is in resonance. The acoustic wave 235 then diffracts a fraction η of this into the direction of the beam 245, but as the beam 245 is also in resonance, the intensity of the beam 245 is magnified within the Fabry-Perot etalon to a value $\eta/(1-R)^2$ times the intensity of the incident beam 220. A fraction (1−R) of this is transmitted into the output beam 250 so that the beam 250 has an intensity η/(1−R) times the intensity of the incident beam 220. The ratio of output beam power to input beam power is therefore 1/(1−R) times larger than would be the case if the Fabry-Perot etalon were absent.

Standard texts on acousto-optic devices such as "Solid State Laser Engineering", W. Koechner, Springer 1999, page 502, show that, provided the length of the acousto-optic interaction $L_a$ is greater than a minimum value given by $$L_a = \frac{2\Lambda^2 n}{\lambda_0} \quad (6)$$

where $\Lambda$ is the wavelength of the acoustic wave 235, $\lambda_0$ is the wavelength of light in a vacuum and n is the refractive index of the material 205, substantially all the light in the travelling beam 225 can be diffracted into the beam 245 and substantially none is diffracted into higher orders of diffraction. This effect is known as Bragg diffraction. Maximum diffraction efficiency requires—the "Bragg Condition"—that the direction of propagation of the acoustic wave 235 with respect to the surfaces of reflectors 210 and 215 should be $(\theta+\phi)/2$, known as a Bragg angle.

The above-referenced text book of Koechner shows that when the conditions for Bragg diffraction apply, the ratio of beam intensity in the diffracted wave 245 ($I_{245}$) relative to the intensity in the travelling beam 225 ($I_{225}$) is $$\frac{I_{245}}{I_{225}} = \sin^2(\sqrt{\xi}) \text{ where } \xi = \frac{\pi^2}{2\lambda^2} \cdot \frac{n^6 p^2}{\rho V^3} \cdot \frac{P_a L_a}{H} \quad (7)$$

where p is the relevant photoelastic tensor component of the material 205, $\rho$ is the density, V is the acoustic velocity in the material 205, $P_a$ is the acoustic power and H is the height of the acoustic beam 235 in a direction perpendicular to both the direction of propagation of the acoustic beam 235 and that of the incident light beam 220. For a given acoustic power $P_a$ the diffraction efficiency improves as the interaction length (spacing of the reflectors 210 and 215) $L_a$ increases. Therefore there is an advantage in efficiency by making the length of the Fabry-Perot etalon as large as possible. As the length is increased however, the bandwidth of the optical resonances is decreased and the angular range over which resonance can be maintained is also reduced. This conflicts with the requirements for optical devices. For acousto-optical modulators and beam deflectors it is desirable to make the bandwidth as large as possible so that precise tuning of the optical wavelength is not required; and for beam deflectors the angular range of operation should be as large as possible to enable a large angular field to be scanned. The inventor in the present case has found, according to a preferred embodiment of the present invention, that these conflicting requirements can be reconciled by cascading a series of Fabry-Perot etalons together to make an acousto-optic device based upon a one-dimensional photonic crystal. Thus, a first preferred embodiment of the present invention will now be described with reference to FIG. 3.

Figure 3:
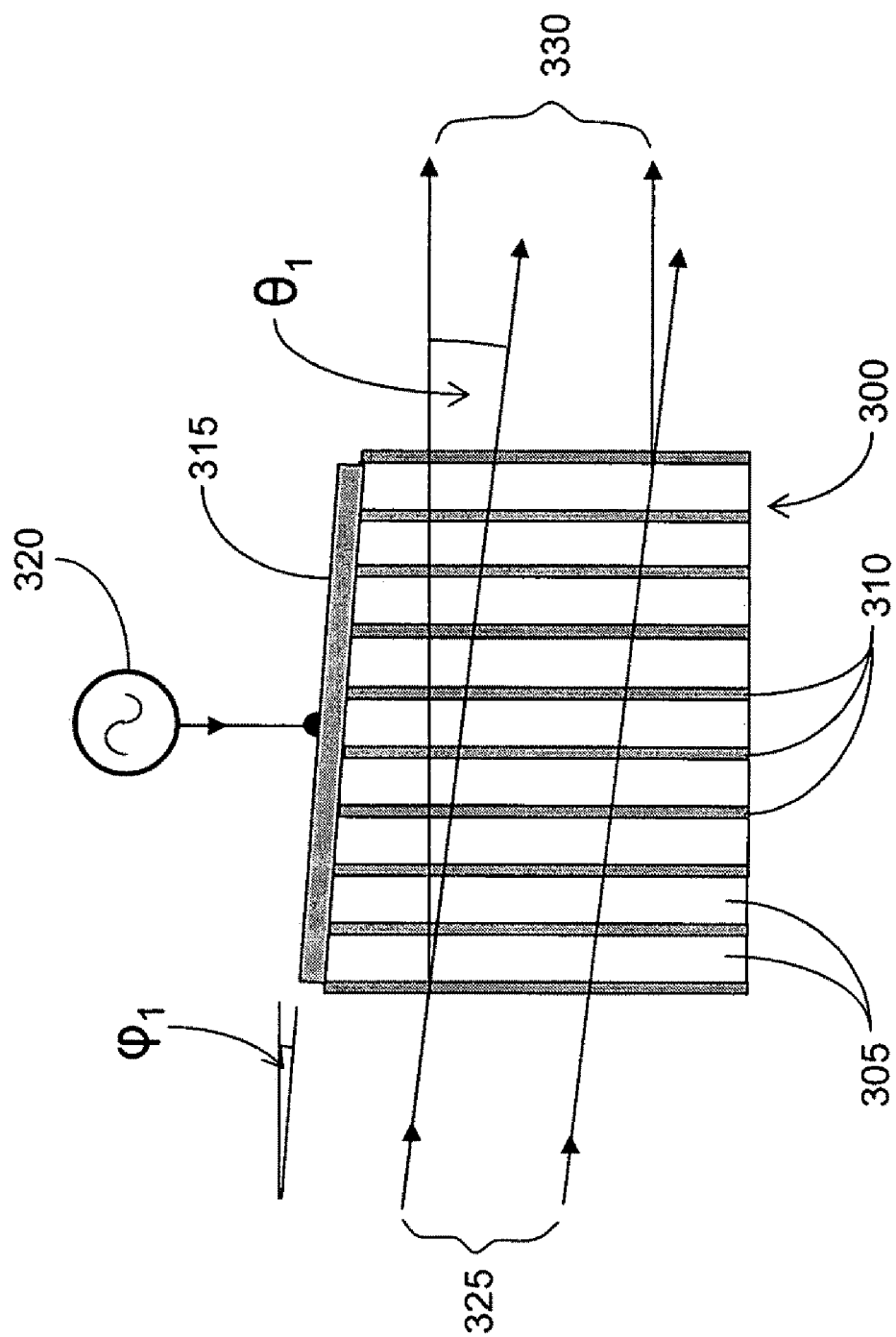
FIG. 3 shows a sectional view through an acousto-optic device having multiple optical resonators according to a first preferred embodiment of the present invention.

Referring to FIG. 3, a sectional view is provided of an improved acousto-optic device according a first embodiment of the present invention, comprising a number of thin plates 305 of a transparent dielectric material bonded together with reflective coatings 310 in between to create a block of plates 300. This method of construction, involving the stacking and bonding of separate layers, offers a simpler and less expensive solution for making structures for use with infra-red light of wavelengths in the region of 10 microns where structures of large optical aperture are needed. The mechanical tolerances achievable are satisfactory in such applications. All the plates 305 have the same thickness and have plane parallel surfaces, while all the reflectors 310 have the same reflectivity $R_1$. Each plate 305, together with the adjacent pair of reflectors 310, forms a Fabry-Perot etalon. As all the plates 305 have the same thickness, and consequently all the Fabry-Perot etalons resonate at the same frequencies, so at frequencies close to the resonance frequencies defined by equation 3 light is transmitted through the whole block 300 and little is reflected.

An acoustic transducer 315 is bonded onto one side of the block 300, powered by an RF source 320 which may operate typically at frequencies between 40 MHz and 2 GHz. A laser beam 325, incident on one side of the block 300, passes through the block 300 when the laser frequency is tuned close to one or other of the resonance frequencies of the Fabry-Perot etalons. The incident light beam 325 is diffracted by the acoustic beam from the transducer 315 into an output beam 330. The angle of incidence of the incident beam 325 on the surface of the reflectors 310 is adjusted so that the direction of the output beam 330 is approximately normal to the reflectors 310, and the frequency of the incident beam 325 is adjusted so that it corresponds approximately to a resonance frequency of the block 300. Similarly the angle of incidence of the incident beam 325 on the reflectors 310 is also adjusted to correspond with a resonance condition in accordance with equation 3. The surface on which the acoustic transducer 315 is mounted is inclined at an angle $\phi_1$ to the normal to the planes of the reflectors 310, designed to be approximately half the diffraction angle $\theta_1$ relative to the normal to the reflectors 310, so that the Bragg condition is met, and consequently the incident light beam 325 is diffracted into the output beam 330 with maximum efficiency.

As the acoustic frequency of signals from the source 320 is varied, the angle of the output beam 330 changes, so the device can be used as a variable beam deflector or scanner. The angular range over which it can scan is limited however by the need to maintain the optical resonance condition in accordance with equation 1. This equation shows that as the angle of the output beam 330 changes, the intensity of the output beam 330 also changes. The angular range over which the output intensity is maintained to within 50% of the maximum is shown by equation 1 to be $$\Delta\theta = \sqrt{\frac{2n\lambda(1-R_1)}{\pi L_a R_1^{0.5}}} \quad (8)$$

The angular range varies inversely with the square root of the thickness $L_a$ of plates 305, so a wide range of angular deflection can be obtained only by making $L_a$ small. Reducing $L_a$ will not affect the enhancement in diffraction efficiency due to resonance, provided that the reflectivity of the reflectors 310 is unchanged, and consequently the enhancement of beam intensity within the resonators remains unchanged. Making $L_a$ small makes it difficult to achieve the Bragg condition for individual resonators, but as the diffracted beams from all the resonators in series add together coherently, the Bragg condition is readily maintained by cascading a sufficiently large number of resonators in series. In this case substantially all the output power will be diffracted into a single output beam 330.

Enhancement of diffraction efficiency by slow wave devices such as that described with reference to FIG. 3 can be achieved theoretically for any wavelength $\lambda_o$, but the advantages are particularly clear for wavelengths in the infra-red part of the spectrum where the efficiency of conventional acousto-optic deflectors and modulators is particularly poor. This is because the diffraction efficiency depends on the inverse square of the wavelength as shown in equation 7. Typically tens of watts of acoustic power are needed to achieve adequate diffraction efficiency in conventional devices in the practically important wavelength region around 10 micrometers, and water cooling is typically required. Slow light acousto-optic devices according to preferred embodiments of the present invention can greatly reduce the acoustic power required, while maintaining a similar modulation bandwidth or scan angle, resulting in much more practical non-mechanical scanning devices for laser radar, for example.

An acousto-optic deflector according to a second preferred embodiment of the present invention, for use with light of wavelength of approximately 10 micrometers, will now be described with reference to FIG. 4.

Figure 4:
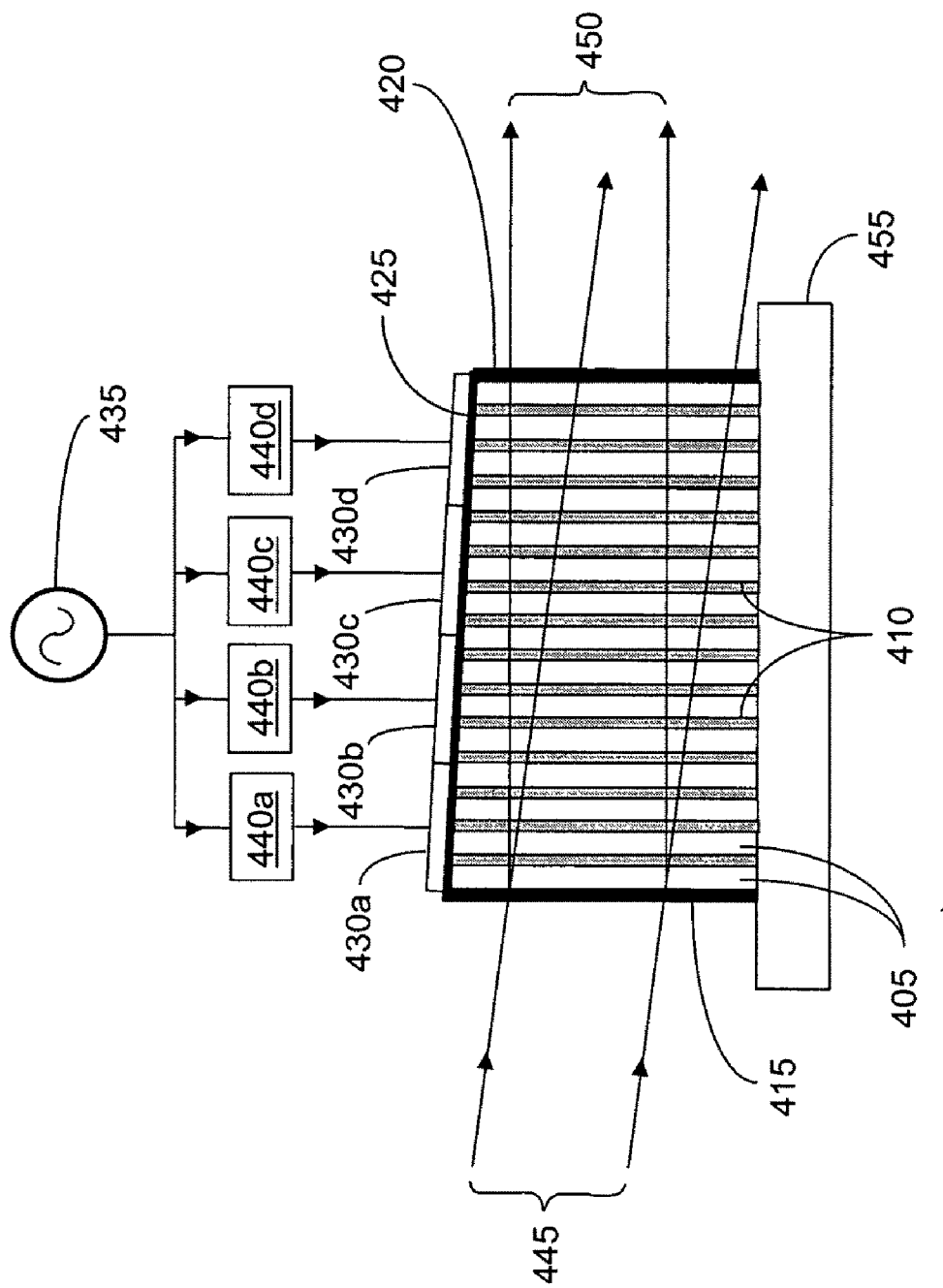
FIG. 4 shows a sectional view through an acousto-optic beam deflector according to a second preferred embodiment of the present invention.

Referring to FIG. 4, a sectional view is provided of the deflector which can be seen to comprise, in an edge-on view, a number of thin plane parallel plates 405 made from a material such as germanium that is transparent to infra-red radiation, each plate 405 having a substantially identical thickness and having a multilayer partially transmissive reflective coating 410 applied to one side. The coating materials (410) are chosen to have a similar acoustic impedance to that of the plates 405 so that sound propagates between the plates 405 and the coatings 410 without surface reflection. Of course, the reflective coatings 410 may be applied to both faces of alternate plates 405 with the same effect. The plates 405 are optically contacted together, or bonded with adhesive, such that the plates 405 and the reflectors 410 are interleaved as shown in FIG. 4 to form a block 400 which transmits both acoustic power and optical power at the resonance frequencies of the Fabry-Perot etalons formed by each pair of adjacent reflectors 410. Anti-reflective coatings 415 and 420 are placed on each of the outside surfaces of the block 400. The top surface of the block of plates 400 is polished flat and a metal film 425 is evaporated onto it. Preferably, this top surface is inclined at an angle chosen according to the same criteria as for the device described above with reference to FIG. 3. An acoustic array of transducers 430a, 430b, 430c and 430d is bonded onto the surface of the metal film 425 to form a source of plane acoustic waves. The acoustic array may comprise any number of transducers 430, of which only four transducers 430a-d are shown in FIG. 4 for convenience. The transducers 430a-d are driven from a common source 435 of RF power at a chosen frequency in the range 20-200 MHz. Each transducer 430a-d is fed from the source 435 via a respective delay circuit 440a-d, to form a phased array of acoustic emissions from the transducers 430a-d. The phased array is thereby arranged to produce a plane acoustic wave which travels through the block 400 in a direction which closely matches the Bragg angle for acousto-optic interactions with optical beams travelling through it. The phase delays introduced by circuits 440a-d are designed to vary with the frequency of RF source 435 such that resulting changes in the direction of the acoustic wave produced by the phased array closely match the frequency-dependent changes in the Bragg angle of the acousto-optic interaction, thereby maintaining the Bragg condition for efficient acousto-optic interaction over a wide range of RF frequencies.

In operation, a laser beam 445, for example a beam of 10.6 micrometers wavelength from a $CO_2$ laser, is incident on the block 400 and passes through it without large attenuation provided that the frequency of the incident laser beam 445 is close to a resonance frequency of the FP etalons formed by the reflectors 410. The thickness of the plates 405 is adjusted to be equal to an integral number of half-wavelengths of the light propagating within the plates. The angle of incidence $\theta_1$ of the incident beam 445 on the block 400 is adjusted to be equal to the angle of the first order transmission maximum of the Fabry-Perot etalons, given by $$\theta_1 \approx \arcsin\left(n\sin\left(\sqrt{\frac{\lambda_0}{nL_a}}\right)\right) \tag{9}$$

where n is the refractive index and $L_a$ is the thickness of the plates 405. For a plate thickness of 0.5 mm, a wavelength of 10.6 μm and taking the refractive index of germanium at this wavelength to be 4.006, the angle $\theta_1$ is 0.295 radians (16.9 degrees). The RF drive frequency from the source 435 is designed to be variable over a range centred on the frequency which causes diffraction of light by first-order diffraction into a direction normal to the anti-reflective surfaces 415, 420 of the block 400. Assuming an acoustic velocity in germanium of 4918 m/s, this requires a centre frequency of 135.2 MHz. The reflectors 410 are designed to have a reflectivity of 0.9 at a wavelength of 10.6 μm when sandwiched between germanium plates, giving an enhancement in acousto-optic diffraction efficiency of a factor of approximately 10 according to equation 5. Assuming that the block 400 has a total length L=25 mm, that the incident optical beam 445 has a width of 5 mm, and that the acousto-optic figure of merit for germanium is $1.9 \times 10^{-13} s^3/kg$, the amount of acoustic power needed to achieve 50% diffraction efficiency is approximately 1.5 W according to equation 7. This compares with approximately 15 W for a device of similar dimensions employing conventional acousto-optic technology. A conventional device of this kind would need to be water-cooled to remove the waste heat, while the slow light device according to the present invention would only need to be cooled by conduction through an acoustically absorbing base 455 of the assembly. Altering the frequency of the source 435 alters the angle of emission of the diffracted beam 450 but the angular range over which diffracted beam 450 can be scanned is limited by the zero-order angular field of the FP etalons defined by equation 8. In this example the angular range $\Delta\theta = 0.075$ radians (4.3 degrees). In this case the frequency of the source 435 needs to cover a range from 119 MHz to 157 MHz. If the optical aperture in the direction of the acoustic wave is 25 mm, then the diffraction angle of the diffracted laser beam 450 is approximately $4.2 \times 10^{-4}$ radians, so with the total scan angle $\Delta\theta$ it will be possible to generate approximately 170 resolved spots in the far field. This is adequate for many applications in long range sensing using laser beams.

The beam deflector according to this second preferred embodiment of the present invention may be constructed using conventional optical techniques. The plates 405 are polished to the correct thickness and flatness on an optical polishing machine. Reflective dielectric coatings 410 are applied by vacuum coating and the plates 405 are bonded together by either optical contacting, which forms a molecular bond between the plates and coatings, or by means of a thin layer of adhesive. Acoustic transducers 430a-d may be constructed from lithium niobate for example by conventional grinding and polishing. Metal electrodes are attached to the surfaces of the transducers 430a-d by vacuum coating, and the transducers 430a-d are bonded onto the ground and polished surfaces of the block 400 by vacuum compression bonding or by a thin layer of adhesive.

The angular scan range Δθ of the deflector can be increased by making the plates 405 thinner, although making very thin plates flat and parallel to the required degree is difficult by conventional polishing techniques. For example if the thickness of each of the plates 405 were 25.1 µm, corresponding to 19 half-wavelengths of light at 10.6 µm, then both the incident laser beam 445 and the output beam 450 may both be included within the angular field of the central resonance of the Fabry-Perot etalons. In this case the angular range Δθ of the output beam 450 would be 0.34 radian (19.3 degrees) and the total number of resolved spots in the far field would be 763, sufficient for high resolution imaging by laser radar.

According to a third preferred embodiment of the present invention, an acousto-optic modulator using "slow light" may be constructed as will now be described with reference to FIG. 5.

Figure 5:
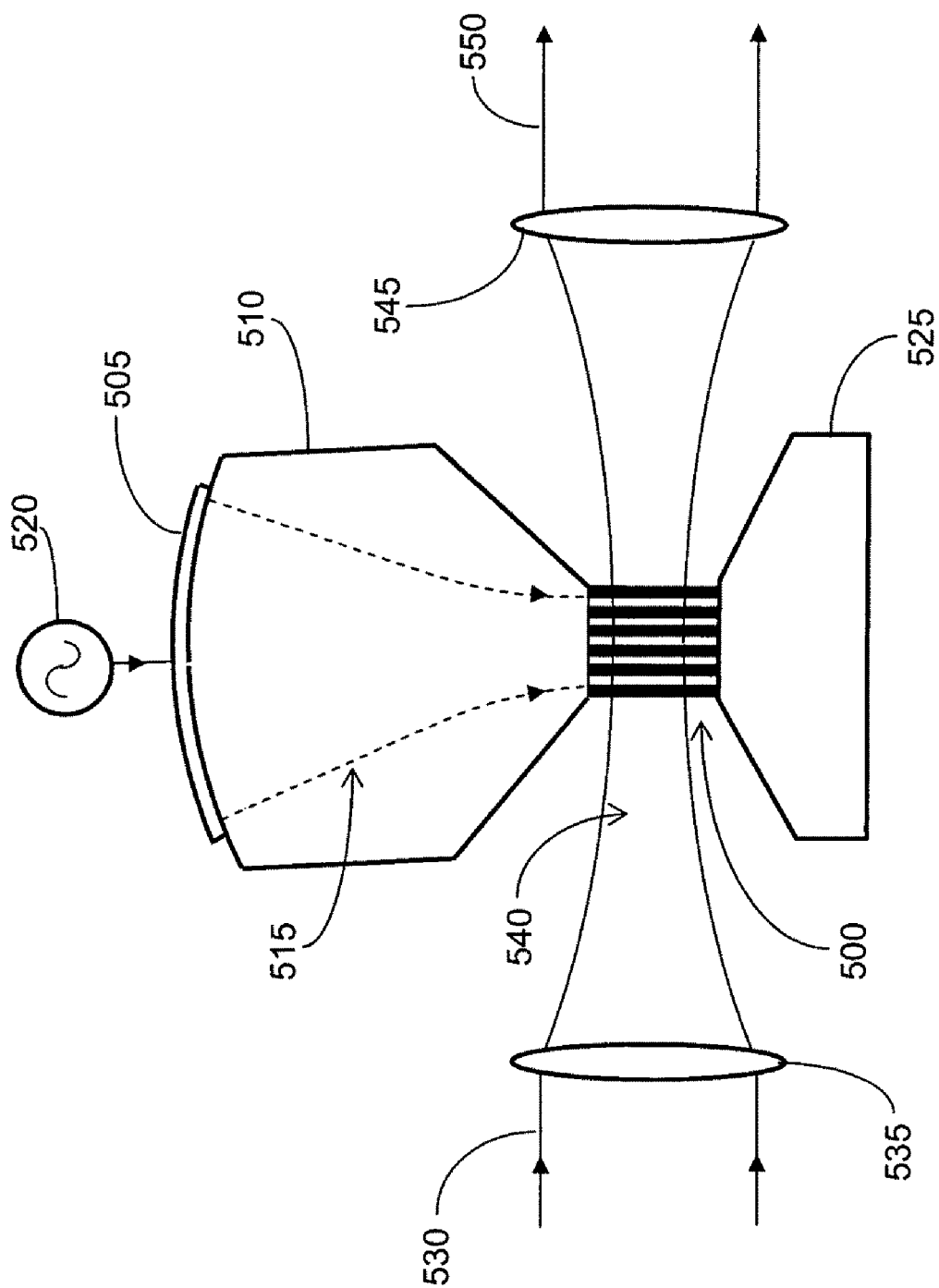
FIG. 5 shows a sectional view through an acousto-optic modulator according to a third preferred embodiment of the present invention.

Referring to FIG. 5, a sectional view is provided of an acousto-optic modulator comprising a block 500 of similar construction to the block 400 of FIG. 4, comprising plates of optically transparent material interspersed with plane parallel reflectors to form a series of Fabry-Perot etalons. A curved acoustic transducer 505 is mounted on an acoustic lens 510 shaped to focus an acoustic beam 515, emitted when the transducer 505 is driven by an RF signal generator 520, into the block 500 so that the beam 515 is approximately collimated inside the block 500. Acoustic power, after passing through the block 500, is absorbed by an absorber 525.

A laser beam 530 is focused by a lens 535 to form a focused beam 540 inside the block 500. Light transmitted through the block 500 is collimated by a lens 545 to form an output beam 550. The direction of the focused light beam 540 is tilted with respect to the direction of the focused acoustic beam 515 so that the acoustic beam 515 is incident at the Bragg angle with respect to the light beam 540 inside the block 500. Light in the focussed beam 540 is therefore diffracted into a second beam (not shown in FIG. 5) which is diffracted out of the optical system and is not used. Variations in power supplied by the RF signal generator 520 therefore cause corresponding variations in the output power of the output beam 550 and may therefore be used to apply amplitude modulation to the output beam 550. The use of a "slow light" material for the block 500, rather than a conventional acousto-optic material, greatly increases the acousto-optic diffraction efficiency inside the block 500, and so enables the output beam 550 to be modulated by substantially less acoustic power than would be required if a conventional material were used. Conserving power enables the optical aperture of the focussed beam 540 to be made smaller, enabling the bandwidth of the modulator, which is determined by the transit time of acoustic waves across the diameter of the focussed beam 540, to be made larger.

In a particular example, the block 500 comprises a slow light medium similar to that described above with reference to FIG. 4, comprising a block of 0.5 mm thick plane parallel plates of germanium bonded together with thin film reflectors of reflectivity 0.9 between them, and thin film anti-reflection coatings applied to the two outer faces of the block 500. The incident laser beam 530 has a wavelength of 10.6 µm and is focused by the lens 535 into the focal region 540 inside the block 500. The focused beam 540 has a diameter of approximately 0.12 mm. The acoustic transducer 505 is driven by an amplitude modulated source (520) having a centre frequency of 135 MHz. The acoustic transducer 505 generates an acoustic beam 515 which is focused by the acoustic lens 510 which is an anamorphic lens producing a focal region inside the block 500 having a diameter of approximately 1.2 mm in the direction of the optical beam 540, and a diameter of approximately 0.1 mm in the direction perpendicular to the focussed optical beam 540, comparable with the diameter of the focussed optical beam 540 itself. The focussed optical beam 540 is incident on the faces of the block 500 at the Bragg angle, while the central axis of the acoustic beam 515 is normal to the optical faces of the block 500. The Bragg angle in this case is approximately 0.145 radians (8.3 degrees). The transit time of the acoustic beam 515 across the focussed optical beam 540 is 24.5 ns, giving a modulation bandwidth of approximately 41 MHz. Using equation 7 it can be shown that the acoustic power needed to modulate the focussed optical beam 540 to a depth of 50% is approximately 0.65 W. This is substantially lower than the power needed by conventional acousto-optic modulators of similar performance.

A device frequently required in coherent laser radar systems is a variable frequency shifter to compensate for a Doppler shift in a return signal caused by movement of the target. If the laser radar operates at a wavelength of approximately 10 µm, and is used to detect aircraft, the Doppler shift arising from moving aircraft may be as high as 100 MHz. Compensation for this frequency shift is normally provided by an acousto-optic device to change the frequency of the local oscillator beam in a heterodyne optical receiver. The frequency shifter usually requires a substantial amount of power, but this may be greatly reduced by the use of slow light devices according to the present invention.

According to a fourth preferred embodiment of the present invention, an acousto-optic frequency shifter using "slow light" may be constructed as will now be described with reference to FIG. 6.

Figure 6:
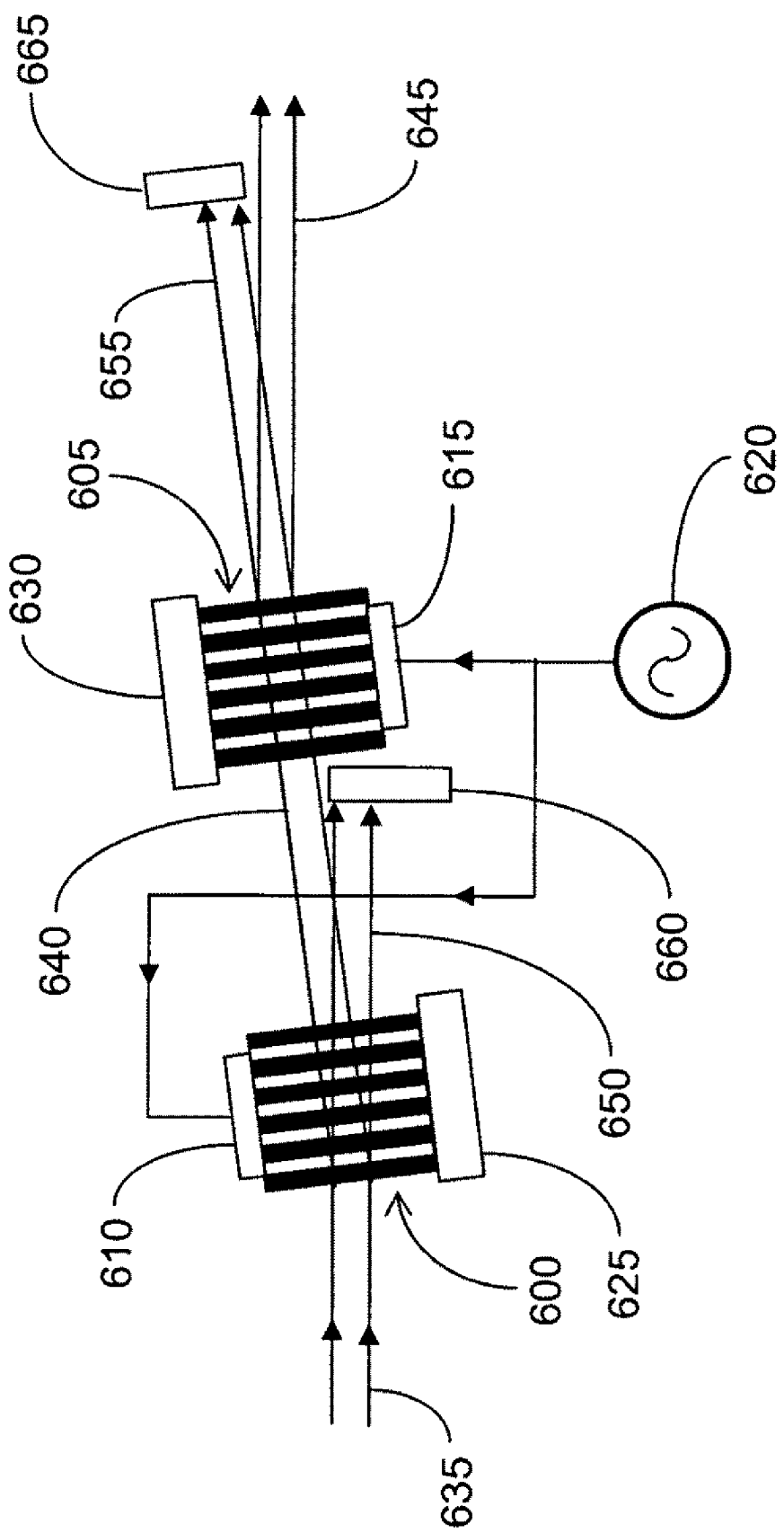
FIG. 6 shows a sectional view through an acousto-optic frequency shifter according to a fourth preferred embodiment of the present invention.

Referring to FIG. 6, a sectional view is provided of an acousto-optic frequency shifter according to the fourth embodiment of the present invention, comprising two acousto-optic devices which are each substantially the same as that described above with reference to FIG. 4. Two blocks 600 and 605, which are each substantially the same as the block 400 of FIG. 4, have acoustic transducers 610 and 615 attached to them, respectively. Each of the transducers 610 and 615 is powered from a common RF signal source 620. For simplicity, the acoustic transducers 610 and 615 are shown in FIG. 6 as single devices, but in practice they comprise transducer arrays similar to the transducer array 430a-d in association with frequency-dependent phase shifters similar to the phase shifters 440a-d, as described above with reference to FIG. 4. The purpose of such transducer and phase shifter arrays is the same as that described with reference to FIG. 4, namely to steer the direction of the acoustic waves propagating in the blocks 600 and 605 to maintain the optimum Bragg angle between the acoustic and optical beams as the acoustic frequency is varied. Acoustic absorbers 625 and 630 are provided to absorb acoustic waves propagating in the blocks 600 and 605 from the transducers 610 and 615.

In use, a collimated monochromatic laser beam 635 is incident on the surface of the block 600 at approximately twice the Bragg angle when the RF signal source 620 is tuned to the centre frequency of its frequency band. At this frequency, an incident beam 635 is diffracted to emerge from the block 600 as an intermediate beam 640 at an angle approximately normal to the exit surface of the block 600 so that the intermediate beam 640 is then incident at an angle approximately normal to a surface of the second block 605. An acoustic wave propagating in the block 605 then diffracts the intermediate beam 640 to form an output beam 645. The diffraction angles produced by the acoustic waves in blocks 600 and 605 are equal and opposite, so the output beam 645 emerges parallel with the incident beam 635, but displaced by a small amount depending on the frequency of the signal generated by the RF signal source 620. The undiffracted portions of the light emerging from blocks 600 and 605 as beams 650 and 655, respectively, are absorbed by acoustic absorbers 660 and 665, respectively. The frequency of each of the intermediate beam 640 and the output beam 645 is reduced on passing through their respective block 600, 605 by an amount equal to the frequency of RF signals generated by the source 620. Thus, the frequency of the output beam 645 is reduced by twice the frequency of the signal generated by the RF source 620 in comparison with the frequency of the incident beam 635.

In a particular example, the RF source 620 generates signals centred at a frequency of 135 MHz and is operable to vary their frequency over a range from 110 MHz to 160 MHz. The incident beam 635 is a monochromatic laser beam at a wavelength of 10.6 μm, and is 5 mm in diameter. The angle of incidence of the incident beam 635 on the block 600 is 0.291 radians (16.7 degrees). Slow light media comprising blocks 600 and 605 are substantially the same as those described above with reference to FIG. 4, and each block is 25 mm in length. Acoustic transducers 610 and 615 are each of overall length 25 mm and have a width, in a direction parallel to the planes of the Fabry-Perot etalons, of 5 mm. The blocks 600 and 605 are separated by 30 mm.

Using equation 7 it is calculated that the acoustic power needed to produce a diffraction efficiency of 50% in each block 600, 605 is approximately 1.5 W, giving an overall optical efficiency of 25% for an overall acoustic power of 3 W. As the RF source 620 is tuneable over a range of 50 MHz, the output beam 645 is shifted in frequency over a range of 100 MHz centred on a frequency of 270 MHz.

According to a fifth preferred embodiment of the present invention an improved acousto-optic tuneable filter will now be described with reference to FIG. 7. Acousto-optic tuneable filters are devices which select a narrow band of wavelengths from a light spectrum, and are operable to change their centre frequency of filtering by changing the frequency of an acoustic wave. The performance of these devices depends on the efficiency of the interaction between the acoustic wave and the light, and so may be improved by the use of a slow light medium according to preferred embodiments of the present invention. Improvements are achievable in respect of the angular field of view of the filters and the maximum wavelength of operation. An acousto-optic tuneable filter according to this fifth embodiment may operate efficiently in the middle-infrared part of the spectrum in particular, corresponding to atmospheric transmission windows from 3 to 5 micrometers and from 8 to 12 micrometers.

Figure 7:
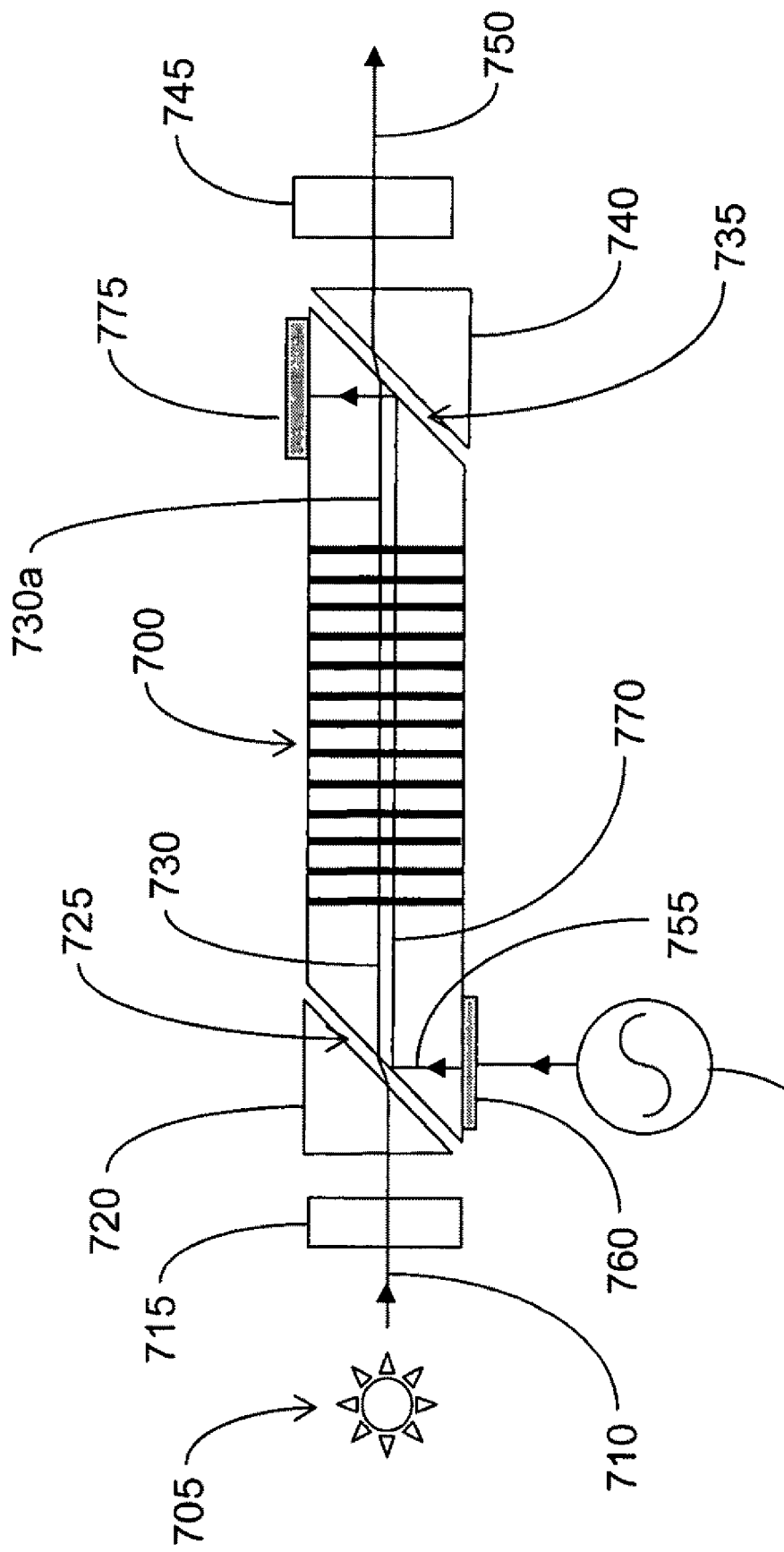
FIG. 7 shows a sectional view through an acousto-optic tuneable optical filter according to a fifth preferred embodiment of the present invention.

Referring to FIG. 7, a sectional view is provided of the improved acousto-optic tuneable filter, comprising a slow light medium 700 having a number of regularly spaced parallel reflectors similar in construction to the block 300 described above with reference to FIG. 3. In operation, a distant light source 705 emits a broad spectrum of light forming an incident beam 710. The incident beam 710 travels though a polariser 715, then through a prism 720 and then through an angled air interface 725 to form an intermediate beam 730 which passes through the slow light medium 700. The medium 700, comprising regularly spaced parallel reflectors, is made from a birefringent material such as lithium niobate which is oriented such that the intermediate light beam 730 propagates as an extraordinary wave along the z-axis of the lithium niobate crystal. Light emerges from the slow light medium 700 through an angled air interface 735 into a prism 740 and then through a polariser 745 to form an output beam 750. An acoustic beam 755 is generated within the slow light medium 700 by a longitudinal wave acoustic transducer 760 driven by a radio frequency signal source 765 which may operate at frequencies typically in the range 100-1500 MHz. Sound from the transducer 760 is reflected from the angled air interface 725 and is converted from a longitudinal wave into a shear wave which propagates as an acoustic beam 770 in a direction substantially parallel with the intermediate light beam 730 propagating through the slow light material 700. The acoustic beam 770, having passed through the medium 700, is reflected from the angled air interface 735 onto a sound-absorbing material 775 and is absorbed by it.

The intermediate light beam 730 propagating collinearly with the shear wave acoustic beam 770 is partially diffracted by the acoustic beam 770 to form a light beam 730a travelling parallel with the intermediate beam 730 but with a polarisation orthogonal to that of the intermediate beam 730. The diffracted beam 730a therefore propagates as an ordinary wave in the birefringent material of medium 700. The polariser 745 is oriented such that it only passes the diffracted wave 730a in the ordinary wave polarisation and rejects the intermediate light beam 730 propagating with the extraordinary wave polarisation. The output beam 750 therefore comprises the component of the diffracted beam 730a passing through the transmission axis of polariser 745. The diffracted light beam 730a is frequency-shifted with respect to the intermediate light beam 730 by the frequency of the acoustic wave 755 generated by the RF source 765, so the frequency of the output beam 750 is the sum of the frequencies of the incident beam 710 and the acoustic frequency from the source 765.

Efficient coupling from an incident beam 710 into an output beam 750 requires that the incident light beam 730, the diffracted light beam 730a and the acoustic shear wave 770 are phase-matched throughout the interaction region in the medium 700. This requires that $$k_o = k_e + k_a \tag{10}$$

where $k_e = 2\pi n_e/\lambda$ is the wave vector of the incident beam 730 in the medium 700, $k_o = 2\pi n_o/\lambda$, is the wave vector of the diffracted beam 730a in the medium 700, and $k_a = 2\pi/\Lambda$ is the wave vector of the acoustic shear wave 770, where $n_e$ and $n_o$ are the extraordinary and ordinary ray refractive indices respectively of the medium 700, $\lambda_0$ is the wavelength of light in a vacuum and $\Lambda$ is the wavelength of sound in the medium 700. The requirement for phase matching restricts the range of wavelengths which are coupled from the intermediate beam 730 to the diffracted beam 730a to a narrow range typically 1 nanometer wide or less at visible wavelengths. All other wavelengths are not efficiently coupled and hence do not emerge from the polariser 745 into the output beam 750.

It can be shown that if the medium 700 were to comprise a uniform birefringent material, without a slow light structure according to the present invention being incorporated, the acoustic power $P_a$ required to produce maximum light intensity in the output beam 750 is $$P_a = \frac{\lambda_0^2 \rho V^3 A}{2L^2 n_o^3 n_e^3 p_{41}^2} \tag{11}$$

where ρ is the density of the material (700), V is the shear wave acoustic velocity in that material (700), L is the length of the acousto-optic interaction region, $p_{41}$ is the photoelastic tensor component of the material (700), and A is the cross-sectional area of the shear wave acoustic beam 770. It can also be shown that the total angular range ψ of the output beam 750 over which the output beam 750 has an intensity greater than 50% of maximum (that is to say the angular aperture) is approximately $$\psi = 2n_e \sqrt{\frac{\lambda_0}{L(n_e - n_o)}} \quad (12)$$

Equation 11 shows that the required acoustic power per unit area of the acoustic beam $P_a/A$ is proportional to the square of the wavelength $\lambda_0$, and is inversely proportional to the square of the interaction length L. The acoustic power requirement therefore becomes large in infra-red portions of the spectrum where $\lambda_0$ is large. Substituting for $\lambda_0$ and L in equation 11 using equation 12 shows that the power requirement increases in proportion to the square of the angular aperture, so an acousto-optic tuneable filter with wide field of view requires a large amount of acoustic power. However, by incorporating a slow light structure into the material (700) comprising a regularly spaced sequence of partially reflecting mirrors for example, as already described above with reference to FIG. 3, the efficiency of the acousto-optic interaction can be greatly increased at wavelengths for which the mirror spacing $L_a$ is approximately equal to an integral number of half-wavelengths of the laser beam in the material (700), that is to say $$L_a \approx \frac{N\lambda_0}{2n_e} \quad (13)$$

where N is an integer. The acoustic power requirement to achieve maximum power in the output beam 750 is then reduced approximately by the factor (1−R) where R is the reflectivity of the mirrors incorporated into the material (700). Incorporating such a slow light structure can therefore greatly increase the angular aperture of acousto-optic tuneable filters by enabling the length L of the interaction region to be reduced for a given amount of acoustic power $P_a$. It can also greatly increase the maximum wavelength $\lambda_0$ which can be efficiently filtered for a given amount of acoustic power $P_a$ and can therefore enable devices according to this fifth embodiment of the present invention to be operated efficiently in the infra-red part of the spectrum.

The filter only operates efficiently in narrow wavelength regions defined by equation 13, but these regions can be made close together by making the separation between mirrors $L_a$ large. The filter therefore operates efficiently at a series of regularly spaced wavelength regions separated by a small interval. Alternatively the mirror separation $L_a$ can be made very small in which case the wavelength range of the resonance regions over which the filter operates efficiently is large, and consequently the filter can tune over a large range without discontinuities between wavelengths.

It will be apparent to a person of ordinary skill in the relevant art that variations may be made in the physical implementation of acousto-optic devices described above without significantly altering the functional features of those devices and hence without departing from the intended scope of the present invention.

The invention claimed is:

1. A tuneable optical filter, comprising:
   a plurality of coupled optical resonators distributed within a dielectric medium having an optical input, for receiving polarized light signals, and an optical output;
   at least one acoustic transducer mounted on a surface of the dielectric medium for generating an acoustic shear wave within the dielectric medium which propagates through said plurality of optical resonators in a direction substantially parallel to the direction of propagation of received light signals when passing therethrough, so as to diffract received light signals having a wavelength within a specified range of wavelengths; and
   a polarizer for selecting light of a required angle of polarization from a light signal output from said optical output.

2. The tuneable optical filter according to claim 1, wherein each of said plurality of optical resonators is a Fabry-Perot etalon.

3. The tuneable optical filter according to claim 1, wherein said plurality of optical resonators is provided by a photonic crystal.

4. The tuneable optical filter according to claim 1, wherein each of said plurality of optical resonators is formed by a first plate of dielectric material having parallel planar faces and a partially transmissive reflective coating applied to one said planar face, and a partially transmissive reflective coating applied to one planar face of a similar, adjacent plate of dielectric material, parallel with that of the first plate, and wherein a plurality of said plates with said reflective coatings are bonded together to form a block of optically coupled optical resonators.

5. The tuneable optical filter according to claim 1, wherein each of said plurality of optical resonators is formed by a plate of a first dielectric material disposed between two adjacent plates of a second different dielectric material having a different refractive index to that of the first material, each of said plates having plane parallel faces, and wherein alternate plates of said first and second dielectric material are bonded together to form a block of optically coupled optical resonators.

6. The tuneable optical filter according to claim 1, further comprising an acoustic absorber located to absorb acoustic energy that has passed through said plurality of optical resonators.

7. The tuneable optical filter according to claim 1, wherein the optical input to the dielectric medium comprises an inclined planar face, and wherein a prism is mounted with one face parallel to said inclined face so as to leave a gap at the interface between the dielectric medium and the prism.

8. The tuneable optical filter according to claim 7, wherein said inclined face is arranged to reflect a longitudinal acoustic wave injected into the dielectric medium by said transducer to thereby create said acoustic shear wave, and wherein the angle of inclination of the inclined face is such that a polarized light signal, on passing through said prism and crossing said gap, enters the dielectric medium and propagates in a direction substantially parallel to the direction of propagation of said acoustic shear wave.

9. The tuneable optical filter according to claim 7, wherein the optical output from the dielectric medium comprises a further inclined planar face and wherein a further prism is mounted with one face parallel to said further inclined face so as to leave a gap at the interface between the dielectric medium and the further prism so that acoustic energy emerging from said plurality of optical resonators is reflected within the dielectric medium by said further inclined face.

10. The tuneable optical filter according to claim 9, further comprising an acoustic absorber located to absorb acoustic energy that has passed through said plurality of optical resonators and wherein the angle of inclination of said further inclined face is such as to reflect said acoustic energy emerging from said plurality of optical resonators towards said acoustic absorber.

11. The tuneable optical filter according to claim 1, wherein the filter is configured to operate in the infra-red part of the spectrum.

12. An optical frequency shifter, comprising:
an acousto-optic module having a plurality of coupled optical resonators located within a dielectric medium and at least one acoustic transducer mounted on a surface of the dielectric medium,
wherein said at least one acoustic transducer is arranged to inject an acoustic wave into said plurality of optical resonators so as to apply a frequency shift by diffraction to an incident light signal passing therethrough.

13. The optical frequency shifter according to claim 12, wherein said at least one acoustic transducer is arranged to inject said acoustic wave into said plurality of optical resonators so that the angle of incidence of said acoustic wave with respect to said light substantially satisfies the Bragg condition for maximum diffraction of said light.

14. The optical frequency shifter according to claim 12, comprising two of said acousto-optic modules arranged in a cascaded manner to apply first and second frequency shifts to an incident light signal passing therethrough.

15. The optical frequency shifter according to claim 12, wherein each of said plurality of optical resonators is a Fabry-Perot etalon.

16. The optical frequency shifter according to claim 12, wherein said plurality of optical resonators is provided by a photonic crystal.

17. The optical frequency shifter according to claim 12, wherein each of said plurality of optical resonators is formed by a first plate of dielectric material having parallel planar faces and a partially transmissive reflective coating applied to one said planar face, and a partially transmissive reflective coating applied to one planar face of a similar, adjacent plate of dielectric material, parallel with that of the first plate, and wherein a plurality of said plates with said reflective coatings are bonded together to form a block of optically coupled optical resonators.

18. The optical frequency shifter according to claim 12, wherein each of said plurality of optical resonators is formed by a plate of a first dielectric material disposed between two adjacent plates of a second different dielectric material having a different refractive index to that of the first material, each of said plates having plane parallel faces, and wherein alternate plates of said first and second dielectric material are bonded together to form a block of optically coupled optical resonators.

19. The acousto-optic module according to claim 12, wherein said at least one acoustic transducer comprises a plurality of transducer elements operable as a phased transducer array to inject an acoustic wave into said plurality of optical resonators at variable angles.

20. The acousto-optic module according to claim 12, wherein an acoustic lens is disposed between said at least one acoustic transducer and said plurality of optical resonators, wherein the acoustic lens is shaped to form a substantially collimated acoustic wave in the vicinity of said plurality of optical resonators.

21. The acousto-optic module according to claim 12, further comprising an acoustic absorber located to absorb acoustic energy that has passed through said plurality of optical resonators.

22. The optical frequency shifter according to claim 12, wherein the shifter is configured to operate in the infra-red part of the spectrum.

* * * * *